(12) United States Patent
Abdukadir et al.

(10) Patent No.: US 9,183,098 B2
(45) Date of Patent: Nov. 10, 2015

(54) MICROCOMPUTER RUNAWAY MONITORING DEVICE

(71) Applicant: Nikki Co., Ltd., Atsugi, Kanagawa (JP)

(72) Inventors: Mamat Abdukadir, Kanagawa (JP); Yoshiyuki Ando, Kanagawa (JP); Umerujan Sawut, Kanagawa (JP)

(73) Assignee: Nikki Co., Ltd., Atsugi, Kanagawa (JP)

( * ) Notice: Subject to any disclaimer, the term of this patent is extended or adjusted under 35 U.S.C. 154(b) by 187 days.

(21) Appl. No.: 14/080,048

(22) Filed: Nov. 14, 2013

(65) Prior Publication Data
US 2014/0143595 A1   May 22, 2014

(30) Foreign Application Priority Data

Nov. 19, 2012 (JP) ................................. 2012-253736

(51) Int. Cl.
G06F 11/00 (2006.01)
G06F 11/16 (2006.01)
G06F 11/07 (2006.01)

(52) U.S. Cl.
CPC ........ G06F 11/1633 (2013.01); G06F 11/0706 (2013.01); G06F 11/0757 (2013.01)

(58) Field of Classification Search
CPC ............ G06F 11/0706; G06F 11/0757; G06F 11/1633
See application file for complete search history.

(56) References Cited

U.S. PATENT DOCUMENTS 6,385,274 B1 * 5/2002 Nohara ............................ 377/20
2003/0093570 A1 * 5/2003 Bissett .......................... 709/248

FOREIGN PATENT DOCUMENTS

JP    63-313247      12/1988
JP    2005-049312 A   2/2005

* cited by examiner

*Primary Examiner* — Michael Maskulinski
(74) *Attorney, Agent, or Firm* — R. Neil Sudol; Henry D. Coleman

(57) ABSTRACT

The invention provides a control device for mutually monitoring two microcomputers at a low cost while reducing a parts number and doubly monitoring abnormality in each of the microcomputers. The control device transmits a reset signal to a main microcomputer and resets the main microcomputer when a frequency of a first pulse signal deviates from a normal frequency range determined by a frequency calculating means, in which the first pulse signal is output from the main microcomputer, and the frequency calculating means calculates a frequency of the first pulse signal by an input of the first pulse signal to a sub microcomputer. The control device transmits a reset signal to the sub microcomputer and resets the sub microcomputer when a frequency of a second pulse signal deflects from a normal frequency range, by an input of the second pulse signal to the main microcomputer from the sub microcomputer.

4 Claims, 4 Drawing Sheets

MICROCOMPUTER RUNAWAY MONITORING DEVICE

BACKGROUND OF THE INVENTION

1. Field of the Invention

The present invention relates to a microcomputer runaway monitoring device.

2. Description of the Conventional Art

There has been conventionally known a microcomputer runaway monitoring device which makes microcomputers including a main microcomputer and a sub microcomputer execute processes in parallel, and detects and resets an abnormality in each of the corresponding microcomputers between both the microcomputers. The microcomputer runaway monitoring device is proposed, for example, in Japanese Unexamined Patent Publication No. 63-313247 and Japanese Unexamined Patent Publication No. 2005-49312.

The conventional microcomputer runaway monitoring device as proposed in the documents is structured, for example, as shown in FIG. 4, such that in a clocking device which actuates a main microcomputer $1a$ operating in a first operation cycle on the basis of a clock signal output from a first oscillation element $4a$, and a sub microcomputer $2a$ operating in a second operation cycle on the basis of a clock signal output from a second oscillation element $5a$ in parallel, and carries out a predetermined clocking processing by the main microcomputer $1a$ and the sub microcomputer $2a$, the main microcomputer $1a$ has a unit configured to output a first pulse signal having a predetermined frequency according to the clocking processing on the basis of the first operation cycle, the sub microcomputer $2a$ inputs the first pulse signal and has a frequency calculating unit configured to calculate a frequency of the first pulse signal according to the clocking processing on the basis of the second operation cycle, and the sub microcomputer $2a$ outputs a first pulse signal (Pu1_sig) to the main microcomputer $1a$. The main microcomputer $1$ is structured such as to calculate a frequency of the first pulse signal (Pu1_sig), stop an output of a second pulse signal (Pu2_sig) in relation to a watch dog timer (WDT) $3$ so as to output a reset signal (RS_sig) to a reset terminal (RSTm) of the main microcomputer $1a$ and a reset terminal (RSTs) of the sub microcomputer $2a$ from the watch dog timer (WDT) $3$ in the case that the calculated frequency (Pu1_fc) deviates from a normal frequency range.

However, according to the microcomputer runaway monitoring device as proposed in the documents mentioned above, in the case that the abnormality is detected in any of the main microcomputer or the sub microcomputer, both of the main microcomputer and the sub microcomputer are simultaneously reset, so that there is a problem that the normal microcomputer is also reset. Further, in the case that the abnormality is generated in the main microcomputer, it is impossible to discriminate whether the sub microcomputer is normal or abnormal.

Further, in the microcomputer runaway monitoring device as proposed in the documents mentioned above, it is necessary to synchronize the frequencies of the main microcomputer and the sub microcomputer in relation to the oscillation elements used in an oscillating circuit, and it is necessary to use the oscillation elements having the same material and the same frequency capacity as the oscillation elements used in the main microcomputer and the sub microcomputer. Accordingly, a total cost increase is caused in the case that an expensive oscillation element is used in one as well as a limitation of parts selectivity is caused.

SUMMARY OF THE INVENTION

Problem to be Solved by the Invention

The present invention is made for the purpose of solving the problem which is included in the microcomputer runaway monitoring device proposed in the documents, and an object of the present invention is to provide a microcomputer runaway monitoring device which can hold down an increase of parts number and be constructed at a low cost, without necessity of synchronizing frequencies of a main microcomputer and a sub microcomputer.

In order to achieve the object mentioned above, according to the present invention, there is provided a microcomputer runaway monitoring device comprising a main microcomputer which is operated in a first operation cycle on the basis of a clock signal output from a first oscillating circuit, and a sub microcomputer which is operated in a second operation cycle on the basis of a clock signal output from a second oscillating circuit, wherein the microcomputer runaway monitoring device actuates the main microcomputer and the sub microcomputer in parallel, carries out a predetermined clocking processing by the main microcomputer and the sub microcomputer, transmits a reset signal to the main microcomputer via a first intermediate control circuit so as to reset the main microcomputer in the case that a frequency of a first pulse signal deviates from a frequency range which can be determined to be normal by a frequency calculating means, the first pulse signal being output from the clocking processing on the basis of the first operation cycle included in the main microcomputer and having a predetermined frequency, the frequency calculating means calculating the frequency of the first pulse signal by an input of the first pulse signal to the sub microcomputer, and transmits a reset signal to the sub microcomputer via a second intermediate control circuit so as to reset the sub microcomputer in the case that a frequency of a second pulse signal deviates from a frequency range which can be determined to be normal by a frequency calculating means, the second pulse signal being output from the clocking processing on the basis of the second operation cycle included in the sub microcomputer and having a predetermined frequency, the frequency calculating means calculating the frequency of the second pulse signal by an input of the second pulse signal to the main microcomputer.

According to the present invention, since the outputs of the reset signals are independent between the main microcomputer and the sub microcomputer, not only the reset signal can be output only to the microcomputer which detects the abnormal value, but also the different kind of oscillation elements can be used.

Further, in the present invention, the microcomputer runaway monitoring device is further provided with an external watch dog timer circuit which outputs a monitoring signal to the main microcomputer in the case that the main microcomputer is normally operated, and outputs a reset signal to a reset input terminal of the main microcomputer in the case that the output of the monitoring signal stops. According to the structure, the double reset means can be provided, and the reset signals can be independently transmitted in the main microcomputer and the sub microcomputer.

Further, in the present invention, the sub microcomputer mounts an internal watch dog timer. According to the structure, the reset signals are transmitted doubly in the sub microcomputer itself, and a reliability is improved.

Effect of the Invention

According to the present invention, since the outputs of the reset signals are structured to be independent between the main microcomputer and the sub microcomputer, the reset signal can be output only to the microcomputer which detects the abnormal value. Further, since the communication way is used in the exchange of the predetermined signal between the main microcomputer and the sub microcomputer, it is not necessary to synchronize the frequency between the main microcomputer and the sub microcomputer, and a degree of freedom for selecting the parts is widened. Further, since the watch dog timer is provided in each of the microcomputers, it is possible to doubly monitor in the respectively independent state.

DETAILED DESCRIPTION OF PREFERRED EMBODIMENT

A description will be in detail given below of a preferable embodiment of the present invention with reference to the accompanying drawings.

Figure 1:
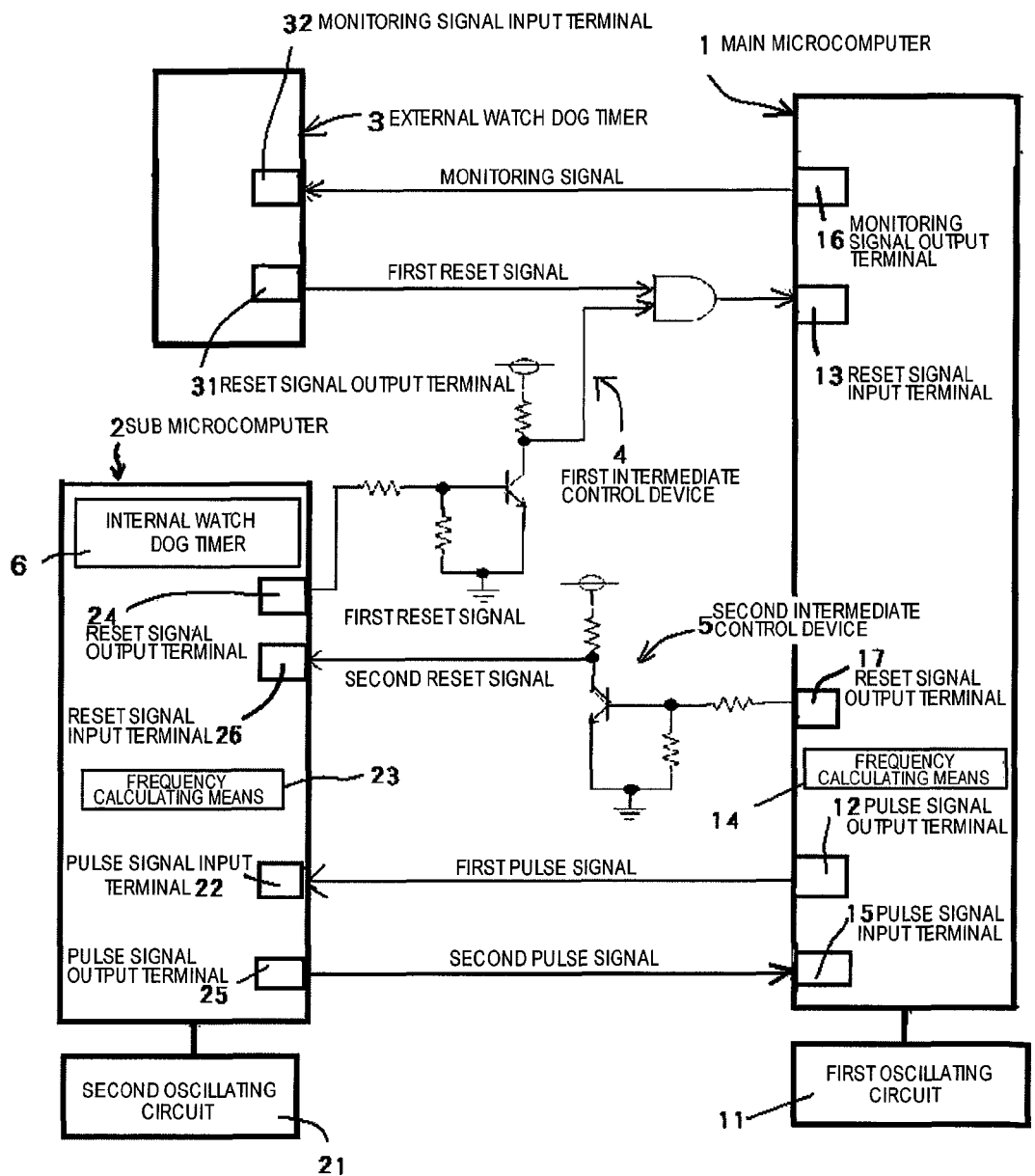
FIG. 1 is a block circuit diagram of an embodiment according to the present invention.
Figure 2:
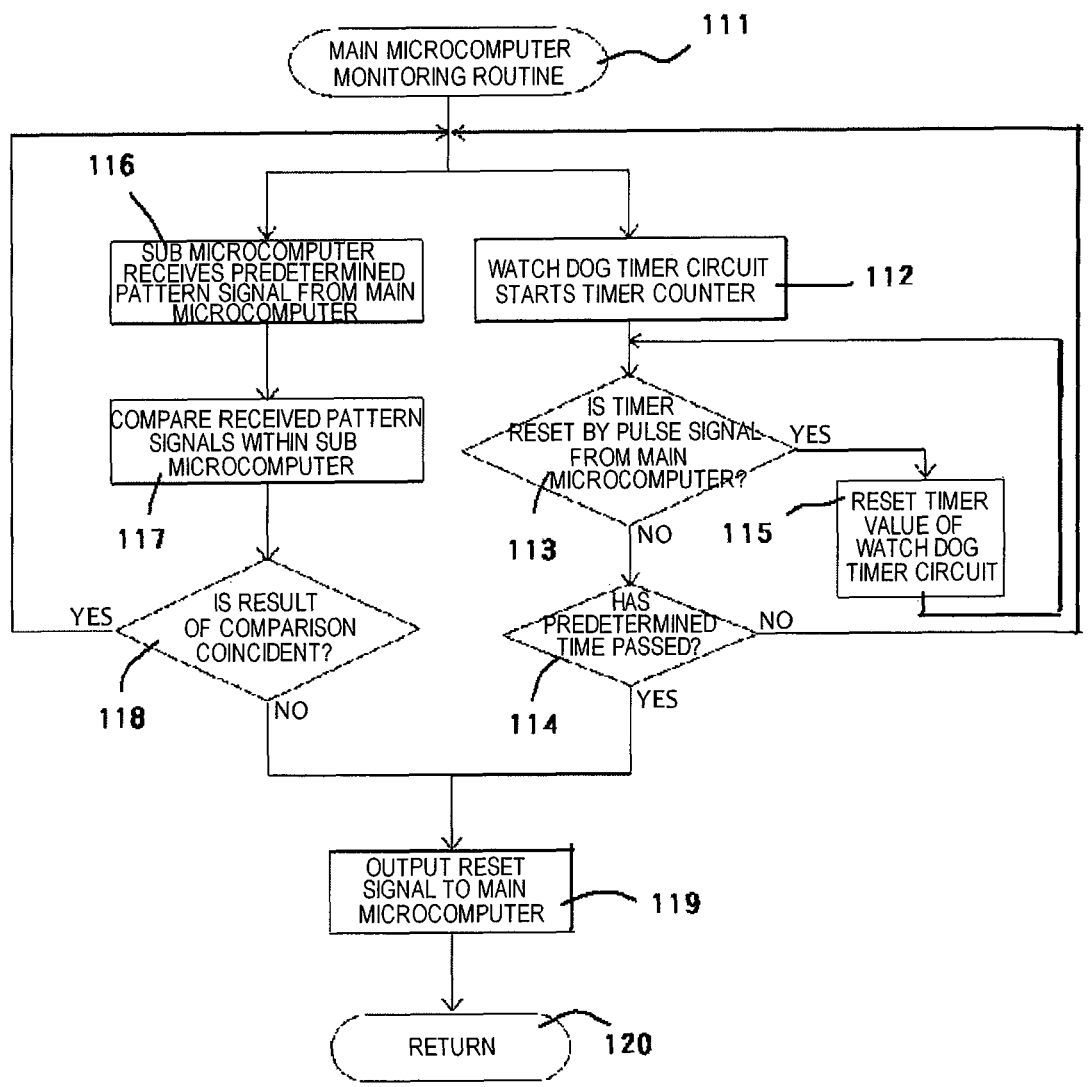
FIG. 2 is a flow chart of an operating processing of a main microcomputer according to the embodiment shown in FIG. 1.
Figure 3:
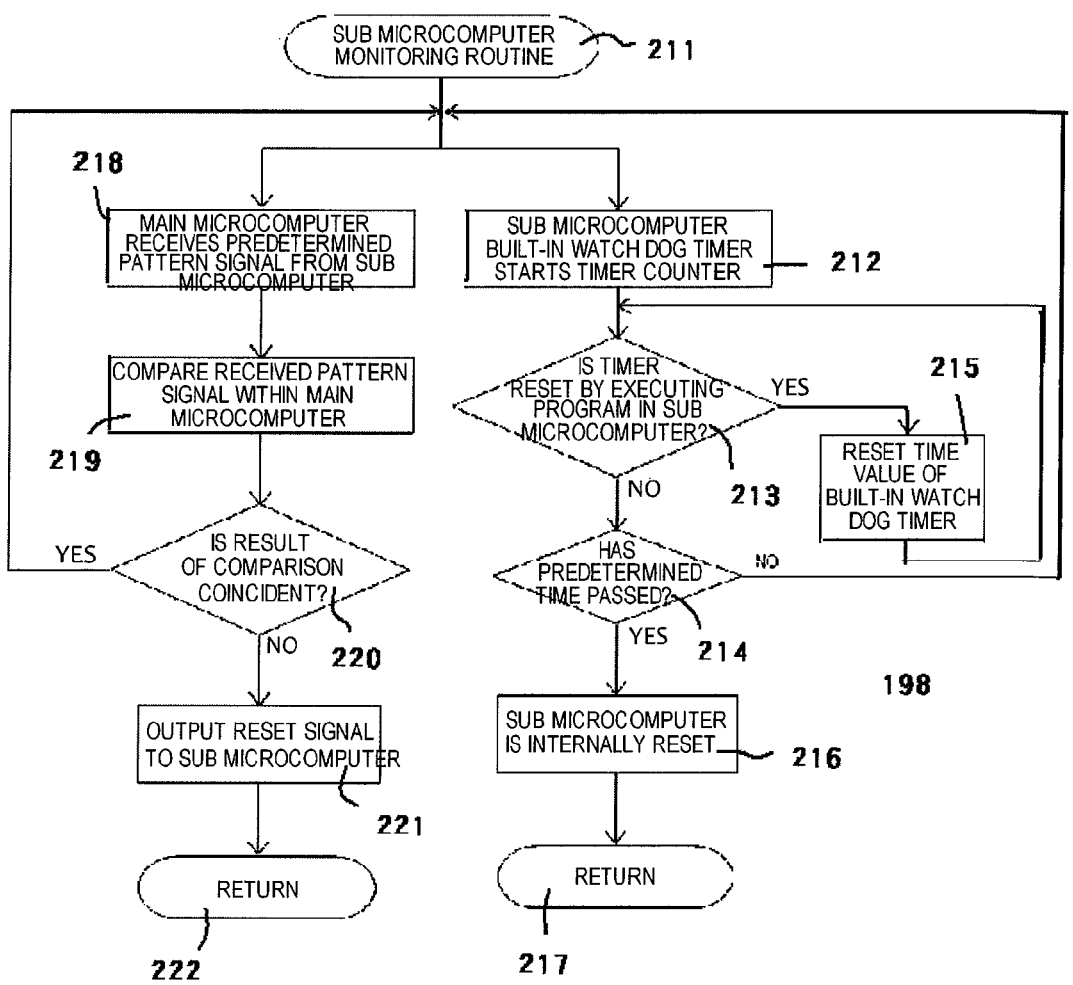
FIG. 3 is a flow chart of an operating processing of a sub microcomputer according to the embodiment shown in FIG. 1.

FIG. 1 is a block circuit diagram of a microcomputer runaway monitoring device according to the present invention, FIG. 2 is a flow chart of an executing program of an operating processing of a main microcomputer according to the embodiment of the present invention shown in FIG. 1, and FIG. 3 is a flow chart of an executing program of an operating processing of a sub microcomputer according to the embodiment shown in FIG. 1.

The microcomputer runaway monitoring device has a main microcomputer 1 which is operated by a first operation cycle on the basis of a clock signal output from a first oscillating circuit 11, and a sub microcomputer 2 which is operated by a second operation cycle on the basis of a clock signal output from a second oscillating circuit 21, and carries out a predetermined clocking processing by the main microcomputer 1 and the sub microcomputer 2, as shown in FIG. 1. The microcomputer runaway monitoring device transmits a reset signal to a reset signal input terminal 13 of the main microcomputer 1 from a reset signal output terminal 24 via a first intermediate control circuit 4 so as to reset the main microcomputer 1 in the case that a frequency of a first pulse signal deviates from a frequency range which can be determined to be normal by a frequency calculating means 23. The first pulse signal is output from the clocking processing on the basis of the first operation cycle included in the main microcomputer 1 and has a predetermined frequency. The frequency calculating means 23 calculates the frequency of the first pulse signal by an input of the first pulse signal to a pulse signal output terminal 12 and a pulse signal input terminal 22 of the sub microcomputer 2.

Further, the microcomputer runaway monitoring device transmits a reset signal to a reset signal input terminal 26 of the sub microcomputer 2 from a reset signal output terminal 17 via a second intermediate control circuit 6 so as to reset the sub microcomputer 2 in the case that a frequency of a second pulse signal deviates from a frequency range which can be determined to be normal by a frequency calculating means 14. The second pulse signal is output from the clocking processing on the basis of the second operation cycle included in the sub microcomputer 2 and has a predetermined frequency. The frequency calculating means 14 calculates the frequency of the second pulse signal by an input of the second pulse signal from a pulse signal output terminal 25 to a pulse signal input terminal 15 of the main microcomputer 1.

Figure 4:
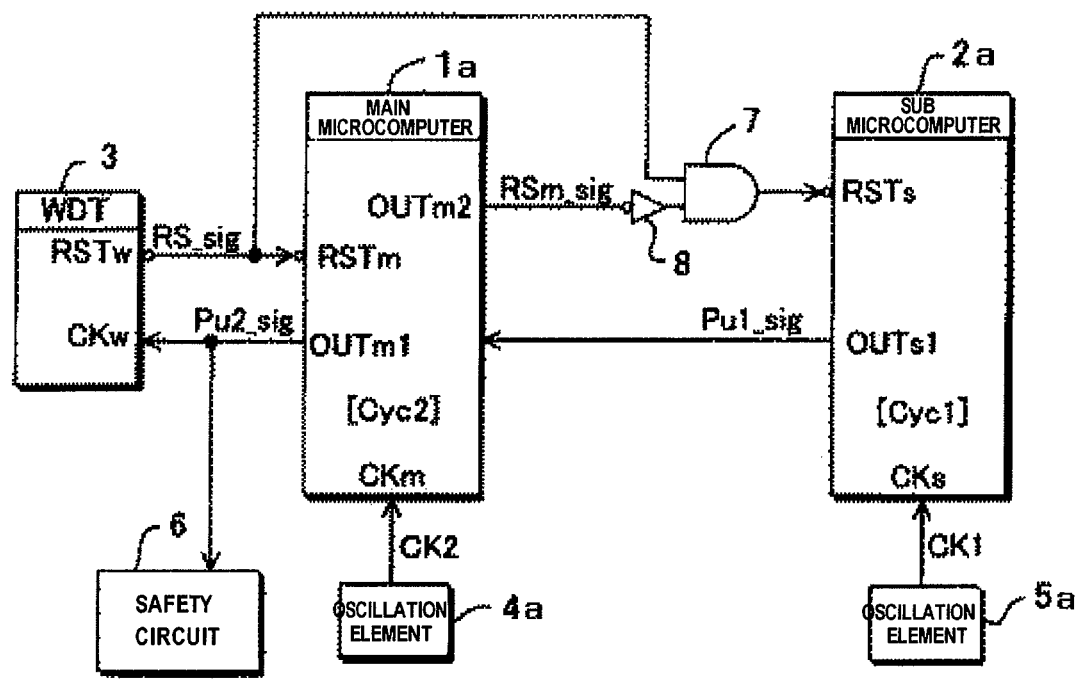
FIG. 4 is a block circuit diagram of a conventional example.

As a result, as is different from the conventional example shown in FIG. 4, the present embodiment employs the pulse signals outputting the operation cycles of the main microcomputer 1 and the sub microcomputer 2 according to the clocking processing on the basis of the respectively unique frequencies while using the first oscillating circuit 11 and the second oscillating circuit 21 which are respectively independent from each other. Accordingly, as is different from the conventional example which uses the pulse signal of the same frequency for each of the main microcomputer and the sub microcomputer, it is not necessary to use the respective pulse oscillating circuits 11 and 12. For example, even in the case that an expensive crystal oscillation element is used in the main microcomputer 1 which is required to be precise, the sub microcomputer 2 which is not required to be so precise can use an inexpensive ceramic oscillation element without using any crystal oscillation element, and an excellent effect can be obtained economically.

Further, in the present embodiment, the main microcomputer 1 and the sub microcomputer 2 are basically reset independently from each other. Therefore, in the case that an abnormality is generated in any of them, only the microcomputer to which the reset signal is transmitted is reset, and the normal microcomputer is not reset.

Further, in the present embodiment, the main microcomputer 1 is provided with an external watch dog timer 3 which intermittently outputs the first pulse signal in the case that the main microcomputer 1 is normally operated, and outputs the reset signal to the reset signal input terminal 13 of the main microcomputer 1 in the case that the output of the first pulse signal stops.

In the same manner as the generally used structure, the external watch dog timer 3 intermittently transmits the first pulse signal (the monitoring signal) which is output from a monitoring signal output terminal 16 of the main microcomputer 1 by a first oscillating circuit 11 in the present embodiment, to a monitoring signal input terminal 31 of the external watch dog timer circuit 3, for example, counts up a timer which is previously defined cycle of about several µs to several ms and is provided in itself, and clears the watch dog timer 3 according to the first pulse signal (the monitoring signal) from the main microcomputer 1. However, in the case that the external watch dog timer 3 reaches a predetermined count valve in a state in which the first pulse signal (the monitoring signal) is not received from the main microcomputer 1, the external watch dog timer 3 assumes that an abnormality is generated in the main microcomputer 1, and outputs the reset signal from the reset signal output terminal 32 provided in the external watch dog timer 3 to the reset signal input terminal 13 of the main microcomputer 1 via the first intermediate control circuit 4 so as to reset the main microcomputer 1.

As mentioned above, the present embodiment secures a reliability that the main microcomputer can be monitored doubly by the external watch dog timer 3 and can be monitored independently from the sub microcomputer 2, as well as the runaway monitoring can be mutually achieved between the main microcomputer and the sub microcomputer 2.

In addition, in the present embodiment, the sub microcomputer 2 mounts an internal watch dog timer 6 in itself, and the sub microcomputer 2 internally emits a monitoring signal and does not participate in the main microcomputer 1 in this regard.

FIG. 2 shows a monitoring routine 111 of an operation of the main microcomputer 1, and the main microcomputer 1 employs double monitoring means constituted by the sub microcomputer 2 and the external watch dog timer 3, as shown in FIG. 1.

After start of the monitoring routine 111 of the main microcomputer 1, if the step receives the second oscillation pulse signal from the sub microcomputer 2 (116), the step compares the received signal pattern with a received pattern signal of a normal value which is previously stored, in an inner portion of the sub microcomputer 2 (117).

As a result of comparison, in the case that the received pattern signal is in a previously stored range, the step assumes it as a normal value so as to return to the main microcomputer monitoring routine 111, however, in the case that the result of comparison of the received signal deviates from the predetermined range, the step outputs a reset signal to the main microcomputer 1 (119), thereby resetting the main microcomputer 1 so as to return (120).

On the other hand, in parallel to the monitoring routine of the sub microcomputer 2, the main microcomputer 1 also carries out a runaway monitoring utilizing the external watch dog timer 3. If the external watch dog timer 3 starts time counter (112), the step receives the watch dog signal from the main microcomputer 1 in a predetermined cycle (113).

In the case that the watch dog timer 3 normally receives the monitoring signal from the main microcomputer 1, the timer of the watch dog timer 3 is reset (115), and the time counter of the watch dog timer 3 is restarted.

However, in the case that the monitoring signal is not received from the main microcomputer 1 within a predetermined time or in the case that a predetermined time has passed, after starting the time counter of the watch dog timer 3 (114), the watch dog timer 3 determines that an abnormality is generated in the main microcomputer 1, and outputs the reset signal to the main microcomputer 1.

On the other hand, FIG. 3 shows a flow chart of a monitoring routine 211 of the sub microcomputer 2, and the monitoring routine 211 of an operation of the sub microcomputer 2 employs double monitoring means constituted by the main microcomputer 1 and the internal watch dog timer 6 embedded in the sub microcomputer 2.

After start of the monitoring routine 211 of the sub microcomputer 2, the step starts receiving 218 the first pulse signal from the main microcomputer 1, and compares the received signal pattern with a received pattern signal of a normal value which is previously stored, in an inner portion of the main microcomputer 1 (219).

As a result of comparison, in the case that the received pattern signal is in a previously stored range, the step assumes it as a normal value and the sub microcomputer 2 returns to the monitoring routine 211. However, in the case that the result of comparison of the received signal deviates from the predetermined range, the step outputs a reset signal to the sub microcomputer 2 (221), thereby resetting the sub microcomputer 2 so as to return (222).

On the other hand, in parallel to the monitoring routine of the main microcomputer 1, the sub microcomputer 2 also carries out a runaway monitoring utilizing the internal watch dog timer 6 mounted in the inner portion of the sub microcomputer. If the internal watch dog timer 6 starts time counter (212), the step receives the watch dog signal from the sub microcomputer 2 in a predetermined cycle (213).

In the case that the internal watch dog timer 6 normally receives the watch dog signal from the sub microcomputer 2, the timer of the internal watch dog timer 6 is reset (215), and the time counter of the internal watch dog timer 6 is restarted.

However, in the case that the watch dog signal is not received or in the case that a predetermined time has passed, after starting the time counter of the internal watch dog timer 6 (214), the internal watch dog timer 6 determines that an abnormality is generated in the sub microcomputer 2, and internally outputs the reset signal to the sub microcomputer 2 so as to reset the sub microcomputer 2 and return (217).

What is claimed is:

1. A microcomputer runaway monitoring device comprising:
   a main microcomputer which is operated in a first operation cycle on the basis of a clock signal output from a first oscillating circuit; and
   a sub microcomputer which is operated in a second operation cycle on the basis of a clock signal output from a second oscillating circuit,
   wherein the microcomputer runaway monitoring device actuates the main microcomputer and the sub microcomputer in parallel, carries out a predetermined clocking processing by said main microcomputer and said sub microcomputer, transmits a reset signal to said main microcomputer via a first intermediate control circuit so as to reset the main microcomputer in the case that a frequency of a first pulse signal deviates from a frequency range which can be determined to be normal by a frequency calculating means, the first pulse signal being output from the clocking processing on the basis of said first operation cycle included in said main microcomputer and having a predetermined frequency, the frequency calculating means calculating the frequency of said first pulse signal by an input of the first pulse signal to the sub microcomputer, and transmits a reset signal to said sub microcomputer via a second intermediate control circuit so as to reset the sub microcomputer in the case that a frequency of a second pulse signal deviates from a frequency range which can be determined to be normal by a frequency calculating means, the second pulse signal being output from the clocking processing on the basis of said second operation cycle included in said sub microcomputer and having a predetermined frequency, the frequency calculating means calculating the frequency of said second pulse signal by an input of the second pulse signal to the main microcomputer.

2. The microcomputer runaway monitoring device according to claim 1, further comprising an external watch dog timer which outputs a monitoring signal to said main microcomputer in the case that said main microcomputer is normally operated, and outputs a reset signal to a reset signal input terminal of the main microcomputer in the case that the output of said first pulse signal stops.

3. The microcomputer runaway monitoring device according to claim 2, wherein said sub microcomputer mounts an internal watch dog timer.

4. The microcomputer runaway monitoring device according to claim 1, wherein said sub microcomputer mounts an internal watch dog timer.

* * * * *